G. TOZER.
Improvement in Wheel-Plows.

No. 128,829.

Patented July 9, 1872.

Witnesses:

Inventor:
G. Tozer
PER
Attorneys.

128,829

UNITED STATES PATENT OFFICE.

GUY TOZER, OF JACKSON, MISSOURI.

IMPROVEMENT IN WHEEL-PLOWS.

Specification forming part of Letters Patent No. 128,829, dated July 9, 1872.

Specification describing a new and useful Improvement in Combined Wheel-Plow and Drainer, invented by GUY TOZER, of Jackson, (Hannibal Post-Office,) in the county of Macon and State of Missouri.

Figure 1:
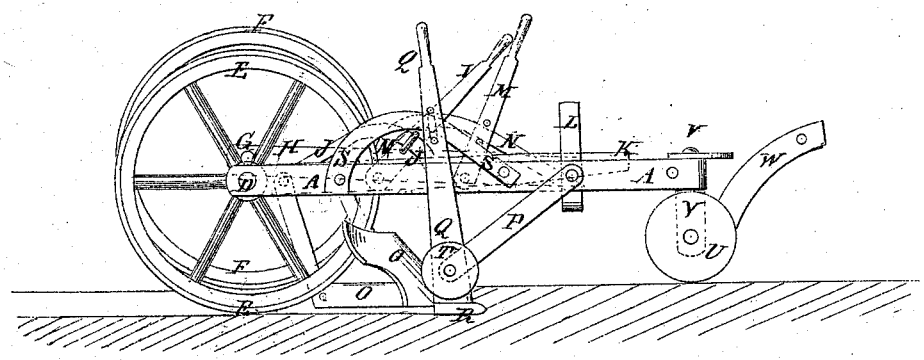
Figure 2:
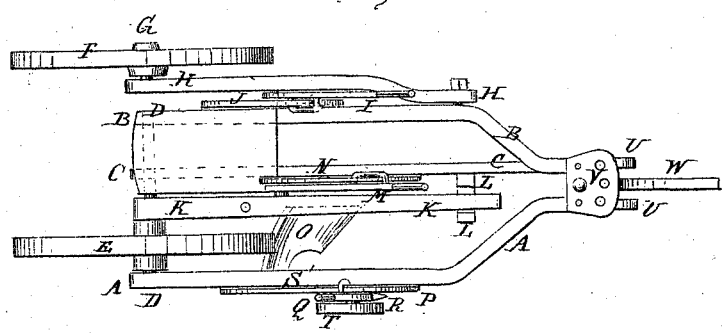

Figure 1 is a side view of my improved machine. Fig. 2 is a top view of the same.

Similar letters of reference indicate corresponding parts.

My invention has for its object to furnish an improved plow, designed more particularly for tight clay soils, but which may be used with advantage in other soils, and which shall be simple in construction, convenient in use, and effective in operation, being so constructed as to open the bottom of the furrow to drain off the surplus water from the roots of the grain to prevent them from being chilled by said water in cold weather or scalded in warm weather; and it consists in the construction and combination of the various parts, as hereinafter more fully described.

A B are the side bars of the main frame, the forward ends of which are securely bolted to each other, a block being interposed between them to serve as a bearing for the caster-wheel standard. C is the intermediate longitudinal bar, the forward end of which is bolted or otherwise secured to the land-side side-bar B, as shown in Fig. 2, so that the bar C may be upon the land-side side of the center of the machine. The rear ends of the bars A B C are connected and held in their proper relative positions by the rod or shaft D, which serves as a journal for the furrow-wheel E. F is the land-side wheel, the journal G of which is attached to the rear end of the bar H, which extends along the outer side of the bar B, and its forward end is pivoted to the forward part of the said bar B. To the inner side of the bar H is pivoted the lower end of the lever I, which lever is connected, by a keeper or other convenient means, with the curved or inclining bar J, the ends of which are attached to the side of the beam B. By this construction, by moving the upper end of the lever I forward the rear end of the bar H will be raised to adjust the wheel F, so that the frame-work of the machine will be level while the wheel F runs upon the unplowed land and the wheel E runs in the furrow. K is the plow-beam, the rear end of which is pivoted to the rod or shaft D at the inner end of the hub of the furrow-wheel E, so that the draft-strain of the plow may be sustained by the said rod or shaft D. The forward end of the plow-beam K enters a slotted guide, L, attached to the middle longitudinal bar C, so that the said beam may be made to move up and down in a vertical plane. The guide L may have holes formed in it to receive a pin to support the beam at any desired point. M is a lever, the lower end of which is pivoted to the plow-beam K. N is a curved or inclined bar, the ends of which are attached to the longitudinal bar C, and with which the lever M is connected by a staple or keeper, so that by operating the lever M the plow-beam may be raised or lowered to regulate the depth at which the plow works in the ground or to raise it away from the ground when desired. O is the plow, which is securly attached to the beam K so as to be just in front of the furrow-wheel E. By this arrangement the furrow-wheel runs in the furrow being opened, and consequently does not raise the plow until the end of the land is reached, and never has to run upon the plowed land while the plow is working. To the forward part of the side bar A is pivoted the forward end of the bar P, to the rear end of which is pivoted the lower part of the standard Q. To the lower end of the standard Q is attached a subsoil or drain plow, R, which opens the soil at the bottom of the previous furrow to loosen it and form a drain into which the water may settle, and thus protect the roots of the plants from being chilled by the water in cold weather or scalded by it in hot weather. S is a curved or inclined bar attached to the side of the bar A, and with which the standard Q is connected by a staple or keeper, so that the plow R may be lowered to or raised from the soil by operating the upper end of the standard Q. The depth to which the plow R enters the ground is limited by a small wheel, T, pivoted to the side of the standard Q, and which rolls along the bottom of the furrow. The forward end of the machine is supported by the small wheel or wheels U, which are pivoted to the lower end of the standard V, which standard is pivoted to the block between the forward ends of the bars A B. With the standard V is connected a rigid arm, W, which is connected with the draft or tongue, so that the wheels U may always follow the line of draft.

Having thus described my invention, I claim as new and desire to secure by Letters Patent—

The frame A B C D, combined with the furrow-wheel E, pivoted bar H, and land-wheel F, as and for the purpose described.

GUY TOZER.

Witnesses:
   CHAS. P. HESS,
   JAMES W. ROBERTS.